United States Patent
Cai et al.

(10) Patent No.: US 11,981,348 B2
(45) Date of Patent: May 14, 2024

(54) AUTOMATED DRIVING CONTROL SYSTEM AND AUTOMATED DRIVING CONTROL APPARATUS

(71) Applicant: NIO TECHNOLOGY (ANHUI) CO., LTD, Hefei (CN)

(72) Inventors: Yunyue Cai, Hefei (CN); Jiong Chen, Hefei (CN); Yan Shi, Hefei (CN); Yang Yang, Hefei (CN); Jianyong Zhang, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 161 days.

(21) Appl. No.: 17/569,717

(22) Filed: Jan. 6, 2022

(65) Prior Publication Data

US 2022/0212692 A1 Jul. 7, 2022

(30) Foreign Application Priority Data

Jan. 7, 2021 (CN) .......................... 202110019023.7

(51) Int. Cl.
*B60W 60/00* (2020.01)

(52) U.S. Cl.
CPC ....... *B60W 60/001* (2020.02); *B60W 2420/42* (2013.01); *B60W 2420/52* (2013.01);
(Continued)

(58) Field of Classification Search
CPC ......... B60W 60/001; B60W 60/00186; B60W 50/0205; B60W 50/023; B60W 50/029; B60W 50/035; B60W 2050/0292; B60W 2050/0295; B60W 2050/0297; B60W 2050/0215; B60W 2420/42; B60W 2420/403; B60W 2420/52; B60W 2420/40; B60W 2420/54; B60W 2510/083; B60W 2520/28; B60W 2540/18; B60W 2556/35;
(Continued)

(56) References Cited

U.S. PATENT DOCUMENTS

2016/0103450 A1* 4/2016 Hogenmueller ..... G05D 1/0077
 701/23
2020/0125858 A1* 4/2020 Bauer ............... H04L 12/40189
(Continued)

OTHER PUBLICATIONS

Extended Search Report for European Patent Application No. 22150381.6, dated May 24, 2022, 9 pages.

*Primary Examiner* — Russell Frejd
*Assistant Examiner* — Brandon Z Willis
(74) *Attorney, Agent, or Firm* — Sheridan Ross P.C.

(57) ABSTRACT

The invention relates to an automated driving control system, including: a data exchange unit configured to obtain video data streams and distribute the video data streams to at least one computing unit; the at least one computing unit configured to compute perception result data based on the video data streams; a sensor fusion unit configured to fuse the perception result data and sensor data, to obtain fusion result data; and a planning control unit configured to generate a driving control instruction based on the fusion result data, where the planning control unit or the sensor fusion unit is configured to provide a bypass of the data exchange unit. When anomalies occur in any of the units, the automated driving control system may provide a corresponding bypass to keep an automated driving function going.

15 Claims, 2 Drawing Sheets

Automated Driving Control System

(52) U.S. Cl.
CPC ... *B60W 2420/54* (2013.01); *B60W 2510/083* (2013.01); *B60W 2520/28* (2013.01); *B60W 2540/18* (2013.01); *B60W 2556/35* (2020.02); *B60W 2556/45* (2020.02)

(58) Field of Classification Search
CPC ..... B60W 2556/45; H04W 4/38; H04W 4/48; H04W 4/40
See application file for complete search history.

(56) References Cited

U.S. PATENT DOCUMENTS

| | | | |
|---|---|---|---|
| 2020/0180653 A1* | 6/2020 | Chi | B60W 50/0205 |
| 2020/0200869 A1 | 6/2020 | Alvarez et al. | |
| 2020/0217666 A1* | 7/2020 | Zhang | G01C 21/1656 |
| 2020/0258382 A1* | 8/2020 | Shi | B60R 11/04 |
| 2022/0032955 A1* | 2/2022 | Xiang | G06V 20/56 |

\* cited by examiner

Automated Driving Control System

Automated Driving Control System

AUTOMATED DRIVING CONTROL SYSTEM AND AUTOMATED DRIVING CONTROL APPARATUS

CROSS-REFERENCE TO RELATED APPLICATION

This application claims the benefit of Chinese Patent Application No. 202110019023.7 filed Jan. 7, 2021, the entire contents of which are incorporated herein by reference in its entirety.

TECHNICAL FIELD

The invention relates to an automated driving control system.

BACKGROUND ART

An automated driving control system needs to have capabilities of perception, fusing, positioning, path planning, policy-making control, vehicle-to-everything (V2X), high speed data transmission, etc., which, in actual application, usually needs connections to a plurality of image capturing apparatuses, millimeter wave radars, laser radars, inertial measurement units, and other devices, to implement advanced driver assistance functions and automated driving functions of different levels. Therefore, an automated driving application and algorithm software pose requirements for a higher computing power, a higher bandwidth, real-time performance, safety, etc. on a control system.

Existing automated driving control systems generally find it difficult to satisfy requirements for both real-time performance and safety, and the systems also have difficulty in recovering quickly from anomalies.

SUMMARY OF THE INVENTION

According to an aspect of the invention, an automated driving control system is provided, including: a data exchange unit configured to obtain video data streams and distribute the video data streams to at least one computing unit; the at least one computing unit configured to compute perception result data based on the video data streams; a sensor fusion unit configured to fuse the perception result data and sensor data from an external sensor, to obtain fusion result data; and a planning control unit configured to generate a driving control instruction based on the fusion result data, where the planning control unit or the sensor fusion unit is configured to provide a bypass of the data exchange unit.

Optionally, the sensor fusion unit is further configured to: compute second perception data when the data exchange unit is in a non-working state, and generate the fusion result data based on the second perception data and the sensor data.

Optionally, the sensor fusion unit is further configured to: generate a second control instruction for driving control when the planning control unit is in a non-working state.

Optionally, the planning control unit is further configured to: compute third perception data when the data exchange unit is in a non-working state, to provide the third perception data for the sensor fusion unit.

Optionally, the planning control unit is further configured to: provide a bypass of the sensor fusion unit, to compute the fusion result data when the sensor fusion unit is in a non-working state.

Optionally, the data exchange unit is further configured to: provide the fusion result data when the sensor fusion unit is in a non-working state.

Optionally, the data exchange unit is further configured to obtain at least one of the following from an external storage apparatus: a configuration parameter of the data exchange unit; a configuration parameter of the sensor fusion unit; and a configuration parameter of the planning control unit.

According to another aspect of the invention, an automated driving control apparatus is provided, including the foregoing automated driving control system.

The automated driving control system provided in the invention can satisfy requirements for both real-time performance and safety when the driving control instruction is used. When an anomaly occurs in the data exchange unit, the bypass provided by the sensor fusion unit or the planning control unit replaces the data exchange unit to work, such that an automated driving function of the vehicle is not affected, and a user may not percept a switch from a main circuit to the bypass. When anomalies occur in other units, the control system may also provide a corresponding bypass to keep the automated driving function going. The automated driving control system may be implemented on an integrated circuit with relatively low manufacturing costs.

DETAILED DESCRIPTION OF EMBODIMENTS

Specific details are presented in the following description in order to provide a thorough understanding of the invention. However, those skilled in the art will clearly know that embodiments of the invention can be implemented even without these specific details. In the invention, specific numerical references may be made, such as "first element", "second element", and so on. However, specific numerical references should not be understood as having to comply with their literal order, but instead, it should be understood that "first element" and "second element" are different.

The specific details proposed by the invention are only exemplary, and the specific details may vary, but still fall within the spirit and scope of the invention. The term "couple" is defined to mean being directly connected to a component or indirectly connected to a component via another component. A "bypass" means another signal (including an electrical signal, a digital signal, etc.) channel other than a main circuit (main signal channel). When switching needs to be performed, a signal that would have passed the main circuit may be transferred between two units and processed through a bypass, without affecting a functionality of an original system. Therefore, the bypass usually includes a processing unit and a signal channel, where the processing unit may be a processing unit of the main circuit that is reused, or may be an independent processing unit.

Hereinafter, preferred embodiments of the method, system, and apparatus suitable for implementing the invention will be described with reference to the accompanying drawings. Although the embodiments are described for a single combination of elements, it should be understood that the invention includes all possible combinations of the disclosed elements. Therefore, if one embodiment includes elements A, B, and C, and the second embodiment includes elements B and D, the invention should also be considered to include other remaining combinations of A, B, C, or D, even if not explicitly disclosed.

Figure 1:
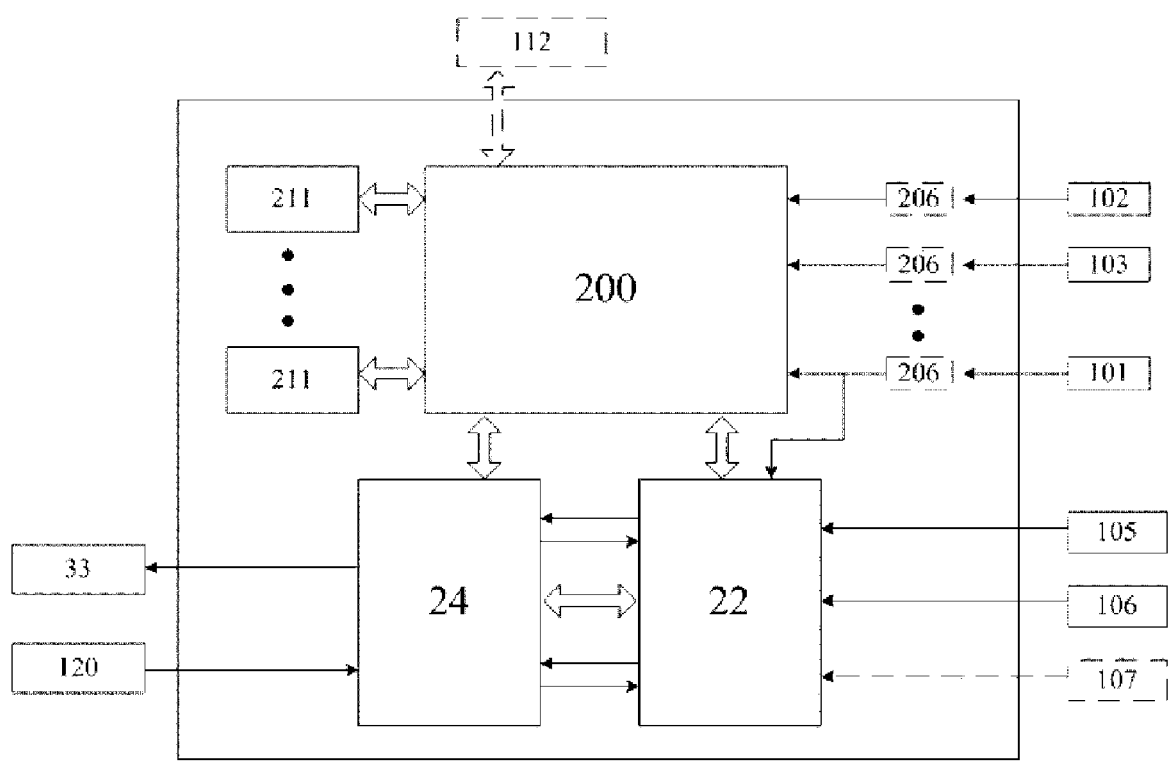
FIG. 1 is a diagram of modules of an automated driving control system according to some embodiments of the invention.

FIG. 1 shows an automated driving control system provided in the invention, and includes a data exchange unit 200, a plurality of computing units 211, a sensor fusion unit 22, and a planning control unit 24. The automated driving control system is implemented on an integrated circuit, where various units may be coupled to each other through a controller area network (CAN) bus. As an example, the data exchange unit 200 may be implemented by using a field programmable gate array (FPGA), and implemented by using register-transfer level (RTL) codes. The FPGA features flexible interfaces and large-scale parallel computation. With such an architecture, the data exchange unit 200 may satisfy requirements on data transmission real-time performance in a high bandwidth, and have flexibility in data stream configuration.

Specifically, the data exchange unit 200 may obtain video data streams from at least one image capturing apparatus 101, 102, and 103 that is disposed on a vehicle, and distribute the video data streams to corresponding computing units 211. Each of the computing units 211 may compute perception result data based on the video data streams, and the perception result data is forwarded to the sensor fusion unit 22 by using the data exchange unit 200. The perception result data includes results of perceiving pedestrians, obstacles, road conditions around the vehicle, to generate the driving control instruction in real time. Therefore, computing power and a bandwidth of the data exchange unit 200 and the computing units 211 need to satisfy requirements on real-time performance. The computing units 211 may be implemented by using a dedicated neural processing unit (NPU), where the NPU specially optimized an algorithm based on neural networks, to enhance execution efficiency of the algorithm.

In some improved embodiments, video data streams obtained by each of the image capturing apparatuses 101, 102, and 103 are provided for a corresponding image signal processor (ISP) 206 for pre-processing, and the pre-processing can filter out noise signals and background image information, and can further extract information about a region of interest. Further, the data exchange unit 200 and the computing units 211 can have less computation loads, thereby helping improve computation efficiency of the control system and real-time performance of the generated driving control instruction.

The sensor fusion unit 22 may fuse the perception result data and sensor data obtained by the sensor fusion unit itself from a forward-looking camera 101 in the image capturing apparatuses, a millimeter wave radar 105, and an ultrasonic sensor 106, to obtain fusion result data. As external sensors, the millimeter wave radar 105 and the ultrasonic sensor 106 may obtain sensor data of higher precision, thereby ensuring safety of automated driving. In some embodiments, only when the perception result data indicates a pedestrian or an obstacle near the vehicle, the millimeter wave radar 105 and the ultrasonic sensor 106 are enabled to perform further sensing, to determine a direction, dimensions, and a distance of one or more pedestrians or obstacles. Therefore, compared with the perception result data, the fusion result data is of higher precision.

The fusion result data is transmitted to the planning control unit 24. The planning control unit 24 may generate the driving control instruction based on the fusion result data, and the driving control instruction is transmitted to an actuator 33 on the vehicle, thereby implementing automated driving or driver assistance. The actuator includes, for example, an accelerator pedal, a brake pedal, and a steering wheel. The driving control instruction includes an acceleration control instruction, a steering wheel angle control instruction, etc. The planning control unit 24 may include a proportional-integral-derivative (PID) controller, a model predictive controller (MPC), a machine learning module that can learn from driving habits of a driver, etc.

In various embodiments of the invention, the planning control unit 24 or the sensor fusion unit 22 is configured to provide or implement a bypass of the data exchange unit 200. Therefore, when the data exchange unit 200 is not working or an anomaly occurs in it, at least part of video data streams and sensor data can access the sensor fusion unit 22 or the planning control unit 24 through the bypass, such that an automated driving (or driver assistance) function is not severely affected, thereby improving system security and reliability.

Figure 2:
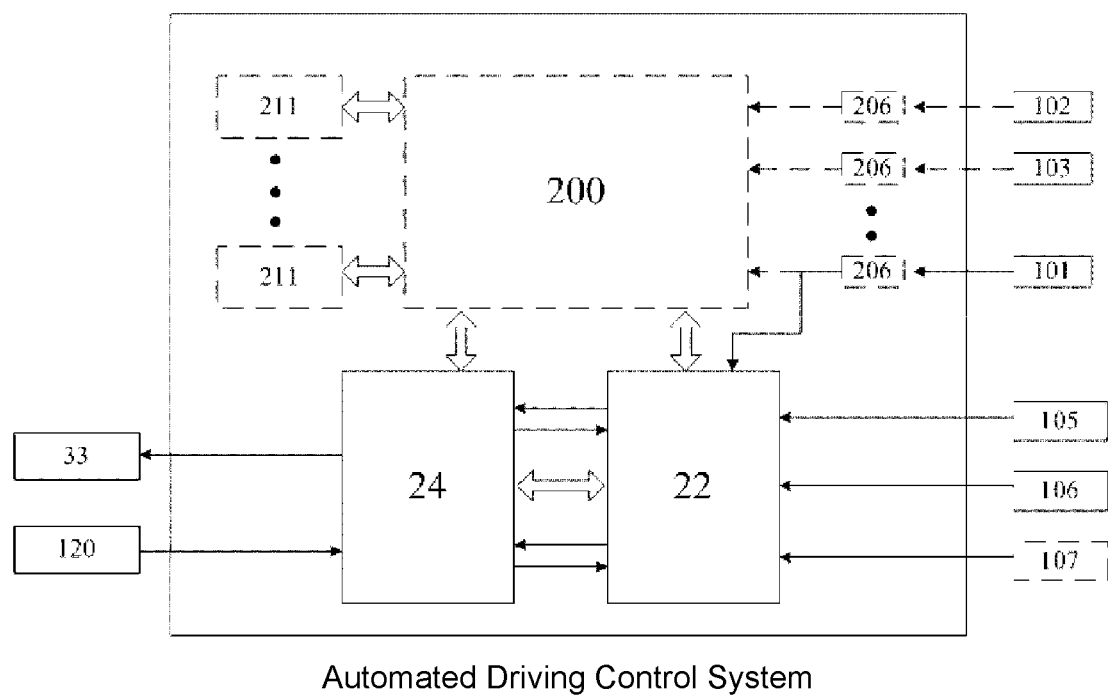
FIG. 2 is a diagram of effective modules of an automated driving control system when a data exchange unit is not working.

In some embodiments, as shown in FIG. 2, when the data exchange unit 200 is a non-working state, the bypass provided by the sensor fusion unit 22 is used (as a bypass of the data exchange unit), and the sensor fusion unit 22 may obtain video data from the forward-looking camera 101 in the image capturing apparatuses and execute a backup perception program to compute second perception data, to replace functionalities of the data exchange unit 200 and the computing units 211. The sensor fusion unit 22 further generates the fusion result data based on the second perception data and the sensor data, where working of the planning control unit 24 may not be affected. Even if the second perception data may not be as accurate as the perception result data generated by the data exchange unit 200 together with the computing units 211, the system can quickly recover when an anomaly occurs in the data exchange unit 200, and a user cannot even perceive a switch from a main circuit of the data exchange unit 200 to the bypass, while the automated driving function of the vehicle can be normally implemented all the time. In FIG. 2, modules that are not working are each shown with a dotted box. In some other embodiments, if anomalies occur in the one or more computing units 211, a handling strategy basically the same as that used when anomalies occur in the data exchange unit 200 may be used. To be specific, a bypass provided by the sensor fusion unit is used to replace the functionalities of the data exchange unit 200 and the computing units 211, or a bypass provided by the planning control unit is used to replace the functionalities of the data exchange unit 200 and the computing units 211.

According to some embodiments of the invention, the sensor fusion unit 22 may further replace the planning control unit 24 for working. Specifically, when there is an anomaly in the planning control unit 24 or the planning control unit is in a non-working state, a bypass provided by the sensor fusion unit 22 is used (as a bypass of the planning control unit), and the sensor fusion unit 22 may execute a backup planning program to generate a second control instruction. In this way, the sensor fusion unit 22 may perform two different types of computations, where the computation implemented by using a main signal channel is to fuse perception result data and sensor data, and the computation implemented by using a bypass is to execute the foregoing backup planning program. The two different types of computations may be implemented by using two independent processors, or implemented by using the same processor through time division multiplexing. The generated second control instruction is transmitted to the actuator 33 for implementing automated driving (or driver assistance). Therefore, when an anomaly occurs in the planning control unit 24, by using the foregoing bypass, the sensor fusion unit 22 can complete at least part of the work of the planning control unit, without affecting the automated driving function.

As a further improvement, the sensor fusion unit 22 further uses a road side unit (RSU) and an onboard unit (OBU) 107 to obtain sensor signals that are based on a V2X technology. These sensor signals may include, for example, traffic light information, road condition information, speed limit information, and other traffic sign information. The sensor fusion unit 22 fuses various sensor signals and the perception result data provided by the data exchange unit 200, to obtain fusion result data which not only indicates a direction, dimensions, and a distance of a pedestrian or an obstacle, but also current road conditions. Correspondingly, the planning control unit 24 (if working normally) may also generate a driving control instruction that more complies with the current road conditions, thereby improving safety of automated driving.

Both the planning control unit 24 and the sensor fusion unit 22 can be implemented based on a general-purpose chip architecture. As an example, the planning control unit 24 and the sensor fusion unit 22 can both use a form of system-on-chip (SoC). In this way, two system-on-chips and an FPGA chip used by the data exchange unit 200 are integrated together on a printed circuit board, forming the automated driving control system that can generate a driving control instruction.

In some embodiments of the invention, the planning control unit 24 provides a bypass to replace the data exchange unit 200 for working. Specifically, when the data exchange unit 200 is in a non-working state, it is not replaced by the sensor fusion unit 22 but the planning control unit 24 for working. The planning control unit 24 uses the bypass provided by itself (as a bypass of the data exchange unit) to obtain a part of video data streams, and execute a backup perception program, to generate third perception data and provide the third perception data to the sensor fusion unit 22. The sensor fusion unit 22 fuses the sensor data and the received third perception data, to generate the fusion result data. Then, a main signal channel of the planning control unit 24 generates the driving control instruction based on the fusion result data. That is, the bypass provided by the planning control unit 24 is followed by the sensor fusion unit 22 in terms of a computational logic, and the main signal channel of the planning control unit 24 follows the sensor fusion unit 22 in terms of the computational logic.

As a further improvement, the planning control unit 24 may further obtain a vehicle body signal from a vehicle body module 120, and generate a driving control instruction based on the vehicle body signal and the fusion result data provided by the sensor fusion unit 22. The vehicle body signal includes, for example, a wheel speed signal, a steering wheel angle signal, a motor torque signal, etc. In this way, the driving control instruction is more detailed, such that the automated driving control system can be upgraded from a service of driver assistance to automated driving.

According to some embodiments of the invention, the planning control unit 24 may further replace the sensor fusion unit 22 for working. Specifically, the planning control unit 24 provides a bypass for the sensor fusion unit 22. When the sensor fusion unit 22 is in a non-working state, the bypass allows a millimeter wave signal (from the millimeter wave radar 105) and an ultrasonic signal (from the ultrasonic sensor 106) that would have entered the sensor fusion unit 22 to enter the bypass where the signals and the perception result data (from the data exchange unit 200) are fused to generate fusion result data. The main signal channel of the planning control unit 24 generates the driving control instruction based on the fusion result data.

In some embodiments of the invention, the data exchange unit 200 may be connected to an external storage apparatus 112, for example, a removable disk, a flash memory, various non-transitory computer-readable storage apparatuses, even smartphones, etc. The data exchange unit 200 may be equipped with a USB interface, a PCIE interface, a Lighting interface, etc. for connection to the external storage apparatus 112. The external storage apparatus 112 may store configuration parameters of various units thereon, including a configuration parameter of the data exchange unit 200, a configuration parameter of the sensor fusion unit 22, and a configuration parameter of the planning control unit 24. These configuration parameters not only can be used for a computation process of a corresponding unit, but also can be used for individualized demands. After a vehicle is started, the data exchange unit 200 automatically reads the configuration parameters of various units from the external storage apparatus. When driver assistance or automated driving is performed, the data exchange unit 200 applies these configuration parameters to itself, the sensor fusion unit 22, and the planning control unit 24. After the vehicle stops, various parameters used by the various units in the driving process may be stored in the external storage apparatus 112. A user may carry the external storage apparatus 112 to another vehicle for use. In this way, individualized parameters for the user may be shared among different vehicles.

In some embodiments of the invention, when the sensor fusion unit 22 is in a non-working state, the data exchange unit 200 may execute a backup fusion program to output fusion result data. Therefore, the data exchange unit 200 may provide a bypass for the sensor fusion unit 22. When required, at least part of sensor data that would have entered the sensor fusion unit 22 may be transmitted to the bypass provided by the data exchange unit 200, and one computing unit 211 executes the backup fusion program to generate fusion result data. The backup fusion program may be a simplified version of a fusion program executed by the sensor fusion unit 22, and is configured to be adapted to be executed by the data exchange unit 200 and the computing unit 211.

In addition to a main signal channel and a bypass between two units, to ensure safety of automated driving, a plurality of output channels may be further provided, and these output channels go to various actuators of the vehicle. In this way, when an anomaly occurs in one output channel, another output channel can replace it for working. As an example, the planning control unit 24 is coupled to various actuators of the vehicle through a first output channel, and the sensor fusion unit 22 is coupled to the various actuators through a second output channel. The two output channels are independent from each other.

The automated driving control system that can generate a driving control instruction provides corresponding bypasses for the data exchange unit 200, the computing units 211, the sensor fusion unit 22, and the planning control unit 24 respectively. In this way, the automated driving control system has a function of redundancy backup. When an anomaly occurs in any of the units, there is a corresponding remedial strategy for keeping the automated driving function of the vehicle going and ensuring driving safety. In addition, the automated driving control system may be implemented on an integrated circuit, and may be manufactured by using available chips on the market as much as possible, thereby lowering implementation costs and facilitating application and promotion in the industry.

An automated driving control apparatus provided in some other embodiments of the invention uses the foregoing automated driving control system to generate a driving control instruction. The automated driving control apparatus may be disposed on a single vehicle, and provide a driver assistance function or an automated driving function for the vehicle. The automated driving control apparatus includes an integrated circuit, where the integrated circuit includes a data exchange unit 200, a plurality of computing units 211, a sensor fusion unit 22, and a planning control unit 24 that are coupled to each other through a CAN bus. The data exchange unit 200 and the computing units are implemented by using an FPGA chip, and the sensor fusion unit 22 and the planning control unit 24 are implemented by using an SoC chip.

In some embodiments, at least part of the automated driving control apparatus may alternatively be implemented by using a set of distributed computing apparatuses connected to a communication network, or be implemented based on "cloud". In such a system, a plurality of distributed computing apparatuses operate together to provide services by using their shared resources. As an example, a plurality of vehicles moving on an expressway may be connected to a public server which provides current road information, speed limit information, etc. such that the various vehicles generate corresponding driving control instructions based on the public information and video data streams and sensor data obtained by the vehicles. The driving control apparatus partly based on the "cloud" features openness, flexibility, and extendibility.

A vehicle with an automated driving function is further provided in the invention, which uses the foregoing automated driving control apparatus to help a driver take a rest by helping with driving or performing automated driving.

Those skilled in the art can understand that various descriptive logical blocks, modules, circuits, algorithm steps described with reference to the aspects disclosed in this specification may be implemented as electronic hardware, computer software, or a combination thereof. To demonstrate interchangeability between the hardware and the software, various descriptive parts, blocks, modules, circuits, and steps above have been described comprehensively based on their functionalities. Whether to implement these functionalities as hardware or software depends on specific application and design constrains imposed on an overall system. Those skilled in the art may implement the described functionalities for specific and particular application based on manners of change. However, determination of such an implementation should not be understood as a departure from the scope of the invention.

The foregoing description is only provided for preferred embodiments of the invention and is not intended to limit the scope of protection of the invention. Those skilled in the art may make various variation designs without departing from the concept and appended claims of the invention.

The invention claimed is:

1. An automated driving control system, comprising:
a data exchange unit configured to obtain video data streams and distribute the video data streams to at least one computing unit;
the at least one computing unit configured to compute perception result data based on the video data streams;
a sensor fusion unit configured to fuse the perception result data and sensor data from an external sensor, to obtain fusion result data; and
a planning control unit configured to generate a driving control instruction based on the fusion result data,
wherein the planning control unit or the sensor fusion unit is configured to provide a bypass of the data exchange unit so that at least part of the video data streams and the sensor data can be sent to the sensor fusion unit or the planning control unit through the bypass when the data exchange unit is not working,
the planning control unit is coupled to an actuator of the vehicle through a first output channel, and the sensor fusion unit is coupled to the actuator through a second output channel which is independent from the first output channel, and when an anomaly occurs in one of the first output channel and the second output channel, it is replaced by another of the first output channel and the second output channel for working.

2. The control system according to claim 1, wherein the sensor fusion unit is further configured to:
compute second perception data when the data exchange unit is in a non-working state, and generate the fusion result data based on the second perception data and the sensor data.

3. The control system according to claim 1, wherein the sensor fusion unit is further configured to:
generate a second control instruction for driving control when the planning control unit is in a non-working state.

4. The control system according to claim 1, wherein the planning control unit is further configured to:
compute third perception data when the data exchange unit is in a non-working state, to provide the third perception data for the sensor fusion unit.

5. The control system according to claim 1, wherein the planning control unit is further configured to:
provide a bypass of the sensor fusion unit, to compute the fusion result data when the sensor fusion unit is in a non-working state.

6. The control system according to claim 1, wherein the data exchange unit is further configured to:
provide the fusion result data when the sensor fusion unit is in a non-working state.

7. The control system according to claim 1, wherein the data exchange unit is implemented by using a field programmable gate array.

8. The control system according to claim 1, wherein the planning control unit and the sensor fusion unit are respectively implemented by using a first chip and a second chip.

9. The control system according to claim 1, wherein the data exchange unit is configured to:
obtain the video data streams from at least one image capturing apparatus disposed in a vehicle.

10. The control system according to claim 9, wherein the data exchange unit is further configured to obtain at least one of the following from an external storage apparatus:
a configuration parameter of the data exchange unit;
a configuration parameter of the sensor fusion unit; and
a configuration parameter of the planning control unit.

11. The control system according to claim 9, wherein the external sensor comprises a forward-looking camera in the at least one image capturing apparatus.

12. The control system according to claim 11, wherein the external sensor comprises:

a millimeter wave radar;
an ultrasonic sensor;
a road side unit; and
an onboard unit.

13. The control system according to claim 9, wherein the planning control unit is further configured to obtain a vehicle body signal, and generate the driving control instruction based on the vehicle body signal and the fusion result data, wherein the vehicle body signal comprises at least one of the following:
   a wheel speed;
   a steering wheel angle; and
   a motor torque.

14. An automated driving control apparatus, comprising an automated driving control system, wherein the automated driving control system comprises:
   a data exchange unit configured to obtain video data streams and distribute the video data streams to at least one computing unit;
   the at least one computing unit configured to compute perception result data based on the video data streams;
   a sensor fusion unit configured to fuse the perception result data and sensor data from an external sensor, to obtain fusion result data; and
   a planning control unit configured to generate a driving control instruction based on the fusion result data, wherein the planning control unit or the sensor fusion unit is configured to provide a bypass of the data exchange unit so that at least part of the video data streams and the sensor data can be sent to the sensor fusion unit or the planning control unit through the bypass when the data exchange unit is not working,
   the planning control unit is coupled to an actuator of the vehicle through a first output channel, and the sensor fusion unit is coupled to the actuator through a second output channel which is independent from the first output channel, and when an anomaly occurs in one of the first output channel and the second output channel, it is replaced by another of the first output channel and the second output channel for working.

15. A vehicle configured to implement automated driving or driver assistance by using the automated driving control apparatus according to claim 14.

* * * * *